United States Patent

Womack

Patent Number: 5,289,731
Date of Patent: Mar. 1, 1994

[54] HAND POWERED MOTOR FOR ROTATIONAL TOOLS AND SIMILAR ARTICLES

[76] Inventor: Terry R. Womack, Rte. 1, Box 575 Z, Forest City, N.C. 28043

[21] Appl. No.: 970,105

[22] Filed: Nov. 2, 1992

[51] Int. Cl.$^5$ .......................... F16H 29/02; B01F 7/22
[52] U.S. Cl. ..................... 74/133; 366/129; 366/605
[58] Field of Search ............... 74/126, 130, 133, 134; 403/300, 306, 362; 366/129, 605

[56] References Cited

U.S. PATENT DOCUMENTS

| | | | |
|---|---|---|---|
| 1,377,418 | 5/1921 | Krogh | 403/306 |
| 2,082,256 | 6/1937 | Netschke | 74/133 |
| 3,035,451 | 5/1962 | O'Connell et al. | 74/133 |
| 3,132,549 | 5/1964 | Lee | 74/133 |

Primary Examiner—Allan D. Herrmann
Attorney, Agent, or Firm—Richard L. Miller

[57] ABSTRACT

A hand powered motor for rotational tools and similar articles is provided which consists of a gun shaped housing having an enlarged barrel portion and a hand grip portion. A trigger assembly is mounted to the hand grip portion of the gun shaped housing, while a shaft extends outwardly from an end of the enlarged barrel portion of the gun shaped housing. A fastener is for coupling the shaft to one of the rotational tools and similar articles. A mechanism within the enlarged barrel portion of the gun shaped housing is for storing kinetic energy and rotating the shaft with one of the rotational tools and similar articles in one direction when the trigger assembly is manually squeezed.

1 Claim, 1 Drawing Sheet

U.S. Patent  Mar. 1, 1994  5,289,731
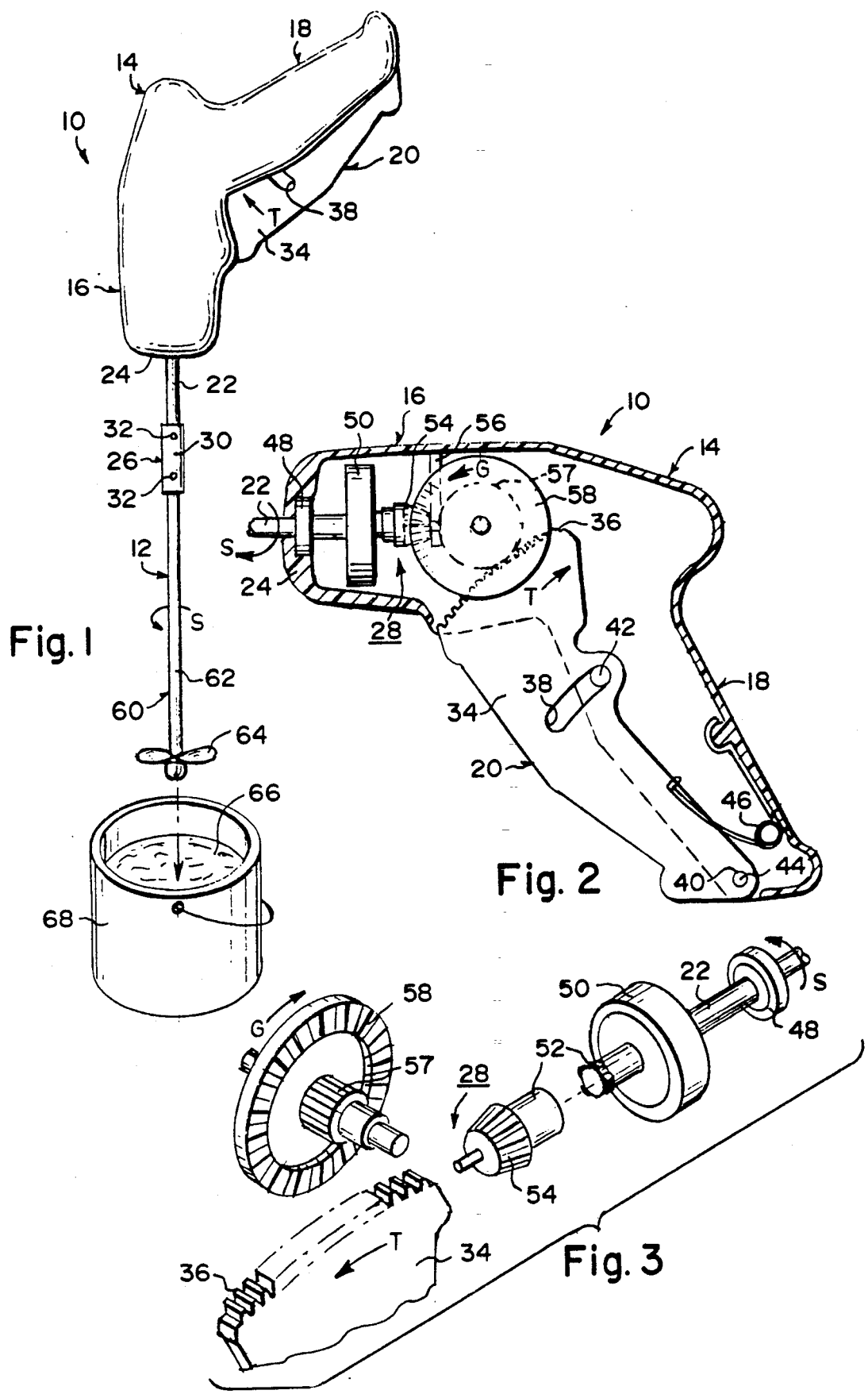

HAND POWERED MOTOR FOR ROTATIONAL TOOLS AND SIMILAR ARTICLES

BACKGROUND OF THE INVENTION

The instant invention relates generally to mixing units and more specifically it relates to a hand powered motor for rotational tools and similar articles.

Numerous mixing units have been provided in the prior art that are adapted to manually agitate, mix and/or blend articles held within a container. For example, U.S. Pat. Nos. 3,415,497 to Johnson; 4,065,811 to Pauty; 4,813,786 to Le Master; 4,854,718 to Wang and 5,049,013 to Engles et al. all are illustrative of such prior art. While these units may be suitable for the particular purpose to which they address, they would not be as suitable for the purpose of the present invention as hereafter described.

SUMMARY OF THE INVENTION

A primary object of the present invention is to provide a hand powered motor for rotational tools and similar articles that will overcome the shortcomings of the prior art devices.

Another object is to provide a hand powered motor for rotational tools and similar articles that can be used to mix many type of liquid, such as paint, etc., without the use of mixing sticks or power tools.

An additional object is to provide a hand powered motor for rotational tools and similar articles in which a manually operated trigger integral with a gear assembly and coupled to a one way clutch will cause a shaft to rotate in one direction when the trigger is squeezed.

A further object is to provide a hand powered motor for rotational tools and similar articles that is simple and easy to use.

A still further object is to provide a hand powered motor for rotational tools and similar articles that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a diagrammatic perspective view illustrating the instant invention ready for use in stirring a typical liquid requiring mixing;

FIG. 2 is a diagrammatic cross sectional view with parts broken away of the hand operated motor portion of the instant invention; and FIG. 3 is a diagrammatic enlarged exploded perspective view with parts broken away illustrating in greater detail the internal mechanism thereof.

DETAILED DESCRIPTION OF THE PREFERRED EMBODIMENTS

Turning now descriptively to the drawings, in which similar reference characters denote similar elements throughout the several views, the Figures illustrate a hand powered motor 10 for rotational tools and similar articles 12, which consists of a gun shaped housing 14 having an enlarged barrel portion 16 and a hand grip portion 18. A trigger assembly 20 is mounted to the hand grip portion 18 of the gun shaped housing 14, while a shaft 22 extends outwardly from an end 24 of the enlarged barrel portion 16 of the gun shaped housing 14. A fastener 26 is for coupling the shaft 22 to one of the rotational tools and similar articles 12. A mechanism 28 within the enlarged barrel portion 16 of the gun shaped housing 14 is for rotating the shaft 22 with one of the rotational tools and similar articles 12 in one direction, when the trigger assembly 20 is manually squeezed.

The coupling fastener 26 includes a cylindrical collar 30 having a central bore and a pair of spaced apart transverse threaded holes extending to the central bore, whereby each opposite side of the central bore of said cylindrical collar 30 can receive a distal end of the shaft 22 and a distal end of one of the rotational tools and similar articles 12. A pair of set screws 32 are provided, each of which threads into the threaded holes in the cylindrical collar 30, so as to retain the distal end of the shaft 22 and the distal end of one of the rotational tools and similar articles 12 within the cylindrical collar 30.

The trigger assembly 20 contains a trigger 34 having a curved rack 36 on a top end, a curved transverse slot 38 generally in the middle thereof and an aperture 40 through a bottom end. A post 42 is formed within the hand grip portion 18 of the gun shaped housing 14, so that the slot 38 in the trigger 34 can slide on the post 42. A pivot pin 44 is within the hand grip portion 18 of the gun shaped housing 14, so that the aperture 40 can fit onto the pivot pin 44 to allow the trigger 34 to pivot thereon. A spring 46 is mounted between a side of the trigger 34 and an inner wall of the hand grip portion 18 of the gun shaped housing 14 to bias the trigger 34 outwardly therefrom.

The one way rotative driving mechanism 28 consists of a bearing 48 mounted on the shaft 22 in the end 24 of the enlarged barrel portion 16 of the gun shaped housing 14. A fly wheel 50 is secured to the shaft 22, while a one way clutch 52 is located at an inner end of the shaft 22. A first bevel gear 54 is rotatively mounted at a partition 56 and rotatively connected to a one way clutch 52, so as to permit rotational movement to be transmitted in only one direction from the first bevel gear 54 to the shaft 22. A integrally formed combination pinion gear 57 and mating second bevel gear 58 is rotatively mounted and transversely positioned within the housing 14, with the first bevel gear 54 engaged with the mating second bevel gear 58, while the curved rack 36 on the trigger 34 is engaged with the pinion gear 57.

When a person grips the hand grip portion 18 of the gun shaped housing 14 and squeezes the trigger 34 in the direction of arrow T, the curved rack 36 will rotate the pinion gear 57 and the second bevel gear 58 in the direction of arrow G simultaneously. This causes the first bevel gear 54 to rotate in the direction of arrow S, which accordingly transmits the rotational movement through the one way clutch 52 to the fly wheel 50 and shaft 22. When the trigger 34 is released the clutch 52 will disengage allowing the shaft 22 to continue to turn in the bearing 48 due to the kinetic rotative energy stored in flywheel 50.

The rotational tool and similar article 12 can be a paint mixer 60, as shown in FIG. 1, which includes an elongated shank 62 and a blade impeller 64 to mix paint 66 within a paint can 63. Other types of rotational tools and similar articles 12 can be fastened to the shaft 22, such as a drill bit, a screwdriver, an awl and a corkscrew.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A hand powered motor for a rotational paint mixing tool and similar articles which comprises:
   a) a gun shaped housing having an enlarged barrel portion and a hand grip portion a rear end thereof;
   b) a trigger assembly mounted to the hand grip portion of said gun shaped housing and including;
      i) a trigger having a curved rack on a top end, a curved transverse slot generally in the middle thereof and an aperture through a bottom end;
      ii) a post formed within the hand grip portion of said gun shaped housing, so that the slot in said trigger can slide on said post;
      iii) a pivot pin within the hand grip portion of said gun shaped housing, so that the aperture can fit onto said pivot pin to allow said trigger to pivot thereon; and
      iv) a spring between the side of said trigger and an inner wall of the hand grip portion of said gun shaped housing to bias said trigger outwardly therefrom;
   c) a shaft extending forward and outwardly from an opposite end of the enlarged barrel portion of said gun shaped housing;
   d) means for coupling said shaft with said rotational tool and including;
      i) a cylindrical collar having a central bore and a pair of spaced apart transverse threaded holes extending to the central bore, whereby each opposite side of the central bore of said cylindrical collar can receive a distal end of said shaft and a distal end of one of the rotational tools; and
      ii) a pair of set screws each of which threads into the threaded holes in said cylindrical collar, so as to retain the distal end of said shaft and the distal end of one of the rotational tools within said cylindrical collar;
   e) a driving means within the enlarged barrel portion of said gun shaped housing, comprising;
      i) a bearing on said shaft in the end of the enlarged barrel portion of said gun shaped housing;
      ii) a flywheel mounted on said shaft;
      iii) a one way clutch connected at an inner end of said shaft;
      iv) a first bevel gear connected to a distal end of said one way clutch; and
      v) a combination pinion gear and mating second bevel gear rotatively and transversely positioned therein, in which said first bevel gear will engage with said mating second bevel gear, while the curved rack on said trigger will engage with said pinion gear whereby manually squeezing said trigger will cause said shaft to rotate in a single direction;
   f) means within the enlarged barrel portion of said gun shaped housing, for storing rotative kinetic energy imparted to said shaft.

* * * * *